United States Patent [19]
Vandermeersch et al.

[11] Patent Number: 4,857,584
[45] Date of Patent: Aug. 15, 1989

[54] TWO-COMPONENT POLYURETHANES

[75] Inventors: Jean Vandermeersch, Montreuil; Guy Durand, Honfleur, both of France

[73] Assignee: Ceca, S.A., France

[21] Appl. No.: 157,854

[22] Filed: Feb. 19, 1988

[51] Int. Cl.$^4$ .............................................. C08L 75/04
[52] U.S. Cl. ............................... 524/791; 252/182.24; 252/182.27; 528/57
[58] Field of Search .......................... 524/791; 528/57; 252/182.24, 182.27

[56] References Cited

U.S. PATENT DOCUMENTS 3,506,593  4/1970  Allenback et al. .................. 252/455
3,755,222  8/1973  Gruber et al. ........................ 260/18

FOREIGN PATENT DOCUMENTS 983215  2/1965  United Kingdom .

*Primary Examiner*—Maurice J. Welsh
*Attorney, Agent, or Firm*—Sigalos, Levine & Montgomery

[57] ABSTRACT

Two-component polyurethanes without inclusion of gas are described, whose hydroxylated component contains a zeolitic dehydrating agent which corresponds to the following formula in its anhydrous form:

$(0.35 \pm 0.20)Na_2O \cdot (0.30 \pm 0.10)K_2O \cdot (0.30 \pm 0.15)CaO \cdot Al_2O_3 \cdot (1.85 \pm 0.50)SiO_2$

6 Claims, No Drawings

TWO-COMPONENT POLYURETHANES

The present invention pertains to noncellular polyurethane resin formulations, improved with respect to their appearance, their mechanical properties and to the perfect preservation of their precursors during storage.

The polyurethanes are macromolecular compounds which result from the reeaction of polyisocynates with polyhydroxylated compounds. In practice, the reaction is carried out at ambient temperature by simply mixing the two components, each containing one of the two reagents, at least one of the components being liquid at ambient temperature. The mixture remains liquid or at least fluid during a certain period of time, which permits its use. This period, which precedes the curing of the product, is commonly called the pot life.

Water, like all hydroxylated derivatives, reacts with the isocyanates. The reaction of water with isocyanate provokes the release of carbon dioxide gas, and if water is inadvertently introduced into the polyisocyanate/polyol mixture, e.g., due to the use of a nonanhydrous polyol, the competitive reaction of the water generates gas bubbles in the product, and these gas bubbles are disadvantageous for the appearance and the mechanical properties of the cured product.

Since it is known that the general appearance and the mechanical properties of polyurethane can be improved by incorporating mineral fillers which are inert with respect to the reagents and do not affect their polycondensation, the idea of using dehydrating agents and more particularly zeolites as the additional filler for the component containing the hydroxylated reagent was exploited.

This type of filler proves to be advantageous for any application of polyurethane in the form of thin films, paints, lacquers, floor and wall coverings, because it neutralizes the diffusion of the ambient humidity into the polyurethane during polymerization. Differential curing of the upper layer, which is the source of cracking of the finished product, is thus avoided.

This was also studied with respect to the application of polyurethanes in electrical coatings and insulations (e.g., transformers and fuse boxes), in which microbubbles, pinholes and cracks deteriorate the quality of the insulation.

However, the zeolites currently used for dehydration, such as the zeolites 4 A, 5 A and 10 A, possess the highly unfavorable property of adsorbing nitrogen from the air at ambient temperature, and the desorption of this nitrogen caused by the exothermic nature of the polymerization reaction again creates undesirable microbubbles.

The idea now leads to the concept of using so-called 3 A zeolites which retain the water to the exclusion of the gases of the air as the dehydrating fillers.

Such zeolites with low open pore content have been known for a long time, and they are known to be able to be prepared from zeolite 4 A by total or partial exchange of the sodium cations by potassium cations.

However, it was observed that such a zeolite 3 A did not represent a really inert filler with respect to the polymerizable system, and after prolonged storage of the hydroxylated compound (it is generally called "resin" in the technical terminology) in its polyol+zeolite 3 A formulation, it happens that the pot life of the resin/polyisocyanate system is considerably reduced to the point of being too short for correct application of the polyurethane.

The applicant found that two-component polyurethanes which are free of gaseous inclusions and whose pot life is only slightly sensitive to the age of the hydroxylated component used in is can be prepared, and the present invention is based on this, i.e., on dehydrating fillers formed by mixed sodium, potassium and calcium zeolites.

In their anhydrous form, the mixed zeolites according to the present invention correspond to the general formula $$a Na_2O . b K_2O . c MO . Al_2O_3 . (1.85 \pm 0.50) SiO_2$$

in which
$b = 0.3 \pm 0.2$,
$c = 0.3 \pm 0.2$,
in which
a is such that $a+b+c=1$;
M is a bivalent alkaline earth metal, more precisely calcium or magnesium, In their anhydrous form, the preferred zeolites correspond to the formula $$(0.35 \pm 0.20)Na_2O \cdot (0.30 \pm 0.10)K_2O \cdot (0.30 \pm 0.15)CaO \cdot Al_2O_3 \cdot (1.85 \pm 0.50)SiO_2.$$

The prior art, more precisely French Pat. No. 6,902,553, teaches us the existence of such substances; the mention of their resistance to hydrothermal decomposition does not suggest their possible application for preparing high-quality polyurethanes.

They can be prepared according to known methods, by simultaneous or consecutive exchange of part of the sodium cations of a type A sodium zeolite, which is now a commercial product, whose general formula is $$(1.0 \pm 0.2)Na_2O . Al_2O_3 . (1.85 \pm 0.5)SiO_2 . y H_2O,$$

in which y depends on the state of hydration of the zeolite and has a value between 0 and 6, by calcium and potassium cations, the [ion] exchange solutions being formed very simply by aqueous solutions of soluble salts of these metals; the useful form of the product is the form dehydrated by heating at temperatures between 250° C. and a maximum of 400° C.

As was mentioned above, the polyurethane is prepared by extemporaneous mixing of the two components: one of them contains the polyisocyanate reagent and is commonly called the curing agent, and the other contains the polyhydroxylated reagent and is commonly called the resin, a term by which it is hereinafter designated.

The fillers and the pigments are contained in the resin; the permanent dehydration is ensured by the presence of mixed zeolite in it.

The amounts of zeolite used depend on the water content in the components of the resin, and it is taken into account in connection with its preparation on the basis of the useful binding capacity of 0.005 to 0.15 g of water per gram of zeolite, a value to be selected as a function of the storage and handling conditions.

It is currently in the range of between 2 wt.% and 20 wt.% resin.

The present invention will be better understood from the following non-limiting examples.

EXAMPLE I

Preparation of a Mixed Zeolite 200 g of anhydrous zeolite 4 A with a particle size smaller than 20 μm (e.g., Siliporite NK10 commercially available from CECA S.A.) are disintegrated.

A solution of 150 g of potassium chloride in 500 ml tap-water is prepared, and 36 g of calcium chloride dihydrate are dissolved in this solution.

This solution is poured while stirring into the zeolite slurry, and the stirring is continued for one hour at ambient temperature.

The precipitate is separated by filtration. The cake is washed to remove all traces of chloride, then dried at 120° C.–150° C. for two hours and activated by treatment at 350° C. to remove the residual water.

A white powder whose nitrogen adsorption is negligible and which keeps indefinitely in hermetically sealed containers is thus obtained.

The composition of this zeolite in the anhydrous form is:

$$0.34Na_2O.0.38K_2O.0.28CaO.Al_2O_3.2SiO_2.$$

EXAMPLE II

Preparation and Behavior of a Resin

(a) Resin 50 g of polyether (Desmophen 550, Bayer) and 50 g of castor oil are mixed.

While stirring vigorously, 15 g of titanium dioxide, 100 g of calcium carbonate and 15 g of zeolite according to Example I are added to this mixture.

The stirring is continued for ca. 20 minutes; the homogeneous mixture obtained is the resin.

(b) Polyurethane 95 g of diphenyl methane diisocyanate are added to the total amount of the resin prepared above.

The curing of the mixture can be monitored by measuring the Brookfield viscosity. The pot life (PL) can be defined as the duration expressed in minutes between the moment at which the polyisocyanate is introduced and the moment at which its viscosity reaches 1,000 poise.

The same experiment is repeated with an aged resin. The simulated aging is carried out by stoving for 24 hours at 40° C. (this test is believed to correspond to spontaneous aging of the resin for one year under average storage conditions).

The following values are thus obtained:
a PL of 50 minutes with the new resin,
a PL of 36 minutes with the aged resin.

EXAMPLE III (Comparative Example)

The pot life tests are repeated according to Example II, but using an ordinary sodium zeolite 4 A (whose nitrogen adsorption, measured at 20° C. under normal atmospheric pressure with a MacBain balance, is ca. 55 ml/g) or a so-called zeolite 3 A obtained by simple ordinary exchange of potassium (such a zeolite can be prepared, as the case may be, by repeating the procedure described in Example I, the difference being the use of an exchange solution prepared from 150 g of potassium chloride in 500 ml of water with the exclusion of calcium chloride); this zeolite 3 A has a composition in the anhydrous form which can be described by the following formula:

$$0.5Na_2O.0.5K_2O.Al_2O_3.2SiO_2.$$

The pot life tests, expressed in minutes, are as follows:

| Zeolite | PL of the initial resin | PL of the aged resin | Observation |
|---|---|---|---|
| 4 A (sodium form) | 41 | 35 | Foaming on the surface |
| 3 A (sodium/potassium form) | 53 | 13 | No foam on the surface |
| Mixed zeolite according to Example I | 50 | 36 | No foam on the surface |

EXAMPLE IV

Various zeolites are prepared according to the present invention according to the process described in Example I but with different exchange solutions.

The following results were obtained for the pot lives of the zeolites according to the present invention, expressed in minutes:

| Product | Exchange solution per 500 ml of water | | Pot life | |
| | KCl | CaCl$_2$, 2H$_2$O | New resin | Aged resin |
|---|---|---|---|---|
| IV/a | 90 | 45 | 60 | 28 |
| IV/b | 250 | 10 | 57 | 24 |
| IV/c | 90 | 100 | 40 | 25 |

We claim:

1. A method for preparing polyurethanes free of gas inclusions by mixing a component containing a hydroxylated reagent and a component containing the polyisocyanate reagent which can be stored separately without any major change in reactivity, characterized in that the component containing the hydroxylated reagent contains a dehydrating agent formed by a zeolite having the general formula in its anhydrous form:

$$aNa_2O.bK_2O.cMO.Al_2O_3.mSiO_2$$

in which
  b is a number between 0.1 and 0.5, and
  c is a number between 0.1 and 0.5,
in which
  a is a number such that $$a+b+c=1;$$

in which
  m is a number between 1.35 and 2.35,
in which
  M is calcium or magnesium.

2. A method for preparing polyurethanes in accordance with claim 1, characterized in that in its anhydrous form, the zeolitic dehydrating agent corresponds to the following formula:

$$aNa_2O.bK_2O.cCaO.Al_2O_3.mSiO_2$$

in which
  b is a number between 0.20 and 0.40, and
  c is a number between 0.15 and 0.45,
in which
  a is a number such that $a+b+c=1$, in which
  m is a number between 1.35 and 2.35.

3. A method for preparing polyurethanes in accordance with claim 1 or 2, characterized in that the zeolitic dehydrating agent accounts for 2 wt.% to 20 wt.% of the hydroxylated component.

4. A storage-stable component for preparing polyurethanes without gas inclusions, consisting of at least on polyhydroxylated organic reagent, and a dehydrating agent characterized in that in its anhydrous form, the dehydrating agent is a zeolite having the following general formula:

$a\mathrm{Na_2O}.b\mathrm{K_2O}.c\mathrm{MO}.\mathrm{Al_2O_3}.m\mathrm{SiO_2}$ in which
  b is a number between 0.1 and 0.5, and
  c is a number between 0.1 and 0.5,
in which
  a is a number such that $a+b+c=1$;

in which
  m a number between 1.35 and 2.35, and in which
  M is calcium or magnesium.

5. A component for polyurethane in accordance with claim 4, characterized in that the dehydrating agent is a zeolite corresponding, in its anhydrous form, to the following formula $a\mathrm{Na_2O}.b\mathrm{K_2O}.c\mathrm{CaO}.\mathrm{Al_2O_3}.m\mathrm{SiO_2}$, in which
  b is a number between 0.20 and 0.40,
  c is a number between 0.15 and 0.45, in which
  a is a number such that $a+b+c=1$;

and
  in which m is a number between 1.35 and 2.35.

6. A component for polyurethane in accordance with claim 4 or 5, characterized in that the zeolite dehydrating agent accounts for 2 wt.% to 20 wt.% of the component.

* * * * *

UNITED STATES PATENT AND TRADEMARK OFFICE
CERTIFICATE OF CORRECTION

PATENT NO. : 4,857,584

DATED : August 15, 19

INVENTOR(S) : Vandermeersch et al

It is certified that error appears in the above-identified patent and that said Letters Patent is hereby corrected as shown below:

Column 5, line 16, "on" should read --one--.

Signed and Sealed this

Nineteenth Day of June, 1990

Attest:

HARRY F. MANBECK, JR.

*Attesting Officer*     *Commissioner of Patents and Trademarks*